United States Patent
Hummel et al.

(10) Patent No.: US 8,087,244 B2
(45) Date of Patent: Jan. 3, 2012

(54) INTERNAL COMBUSTION ENGINE WITH A SYSTEM FOR SECONDARY AIR CHARGING AND METHOD FOR OPERATION OF THE INTERNAL COMBUSTION ENGINE

(75) Inventors: Karl-Ernst Hummel, Bietigheim-Bissingen (DE); Ralf Herrmann, Sachsenheim (DE)

(73) Assignee: Mann+Hummel GmbH, Ludwigsburg (DE)

( * ) Notice: Subject to any disclaimer, the term of this patent is extended or adjusted under 35 U.S.C. 154(b) by 983 days.

(21) Appl. No.: 12/064,649

(22) PCT Filed: Aug. 25, 2005

(86) PCT No.: PCT/EP2005/054176
§ 371 (c)(1),
(2), (4) Date: Feb. 25, 2008

(87) PCT Pub. No.: WO2007/022797
PCT Pub. Date: Mar. 1, 2007

(65) Prior Publication Data
US 2008/0209888 A1 Sep. 4, 2008

(51) Int. Cl.
*F02B 33/44* (2006.01)
*F01N 3/32* (2006.01)
*F01N 5/04* (2006.01)
*F01N 3/00* (2006.01)
*F16K 31/02* (2006.01)

(52) U.S. Cl. ....... 60/605.1; 60/280; 60/289; 251/129.07

(58) Field of Classification Search ............. 60/606, 60/280, 298, 307, 397; 251/129.07; *F02B 37/00, F02B 77/08; F01N 3/30, 3/32, 3/22; F02D 29/02*
See application file for complete search history.

(56) References Cited

U.S. PATENT DOCUMENTS

| | | | |
|---|---|---|---|
| 5,121,604 A * | 6/1992 | Berger et al. | 60/602 |
| 5,458,855 A * | 10/1995 | Gillbrand | 60/289 |
| 6,094,909 A | 8/2000 | Weber et al. | 60/280 |
| 6,295,817 B1 * | 10/2001 | Abthoff et al. | 60/280 |
| 6,334,436 B1 | 1/2002 | Paffrath et al. | 123/564 |
| 6,817,173 B2 * | 11/2004 | Paffrath et al. | 60/289 |
| 6,957,127 B1 * | 10/2005 | Smart et al. | 251/129.07 |
| 7,152,393 B2 * | 12/2006 | Hergemoller et al. | 60/280 |
| 7,162,865 B2 * | 1/2007 | Weigand et al. | 60/289 |
| 7,260,929 B2 * | 8/2007 | Lehmann et al. | 60/289 |
| 7,513,107 B2 * | 4/2009 | Lehmann et al. | 60/289 |
| 7,658,069 B2 * | 2/2010 | Weber et al. | 60/605.1 |

(Continued)

FOREIGN PATENT DOCUMENTS

DE 4219267 A1 12/1993

(Continued)

*Primary Examiner* — Thai Ba Trieu

(57) ABSTRACT

An internal combustion engine with a system for secondary air charging has a combustion unit, an intake air conduit connected to the combustion unit, and an exhaust gas conduit connected to the combustion unit. A throttle is arranged in the intake air conduit. A turbo-engine is connected to the intake air conduit by a supply conduit upstream of the throttle and by a discharge conduit downstream of the throttle. A compressor is provided wherein the turbo-engine is connected operatively to the compressor and wherein the compressor is connected by a connecting line to the exhaust gas conduit. A valve is arranged in the discharge conduit. A vacuum cell actuates the valve. An electro-pneumatic converter is operatively connected to the vacuum cell. The vacuum cell, when reaching a defined differential pressure, opens the valve suddenly so that a vacuum pulse is generated that acts on the turbo-engine.

8 Claims, 5 Drawing Sheets

| U.S. PATENT DOCUMENTS | | | |
|---|---|---|---|
| 2003/0167751 A1* | 9/2003 | Paffrath et al. | 60/285 |
| 2003/0172913 A1* | 9/2003 | Hummel et al. | 123/559.1 |
| 2004/0103646 A1* | 6/2004 | Weigand et al. | 60/280 |
| 2004/0159312 A1 | 8/2004 | Hummel | 123/564 |
| 2005/0166883 A1* | 8/2005 | Freisinger et al. | 123/179.4 |
| 2006/0096279 A1* | 5/2006 | Freisinger et al. | 60/289 |

| FOREIGN PATENT DOCUMENTS | | | |
|---|---|---|---|
| DE | 4338696 A1 * | 5/1995 |
| DE | 10235341 A1 | 2/2004 |
| DE | 102004017608 A1 | 10/2005 |
| WO | WO 0159273 A1 * | 8/2001 |

* cited by examiner

INTERNAL COMBUSTION ENGINE WITH A SYSTEM FOR SECONDARY AIR CHARGING AND METHOD FOR OPERATION OF THE INTERNAL COMBUSTION ENGINE

BACKGROUND OF THE INVENTION

The invention concerns an internal combustion engine comprising a system for secondary air charging comprising an intake air conduit, a combustion unit, an exhaust gas conduit, a throttle, a turbo-engine, and a compressor, wherein the throttle is arranged in the intake air conduit, wherein the turbo-engine is connected correspondingly to the intake air conduit by a supply conduit upstream and by a discharge conduit downstream of the throttle, wherein the turbo-engine is connected in operative connection to the compressor, and wherein the compressor is connected with a connecting line to the exhaust gas conduit. The invention further relates to a method for operating an internal combustion engine with a system for secondary air charging.

DE 42 19 267 A1 discloses a system for secondary air charging in an internal combustion engine. The system for secondary air charging is arranged in an intake conduit of the internal combustion engine. By charging fresh air into the exhaust gas, the exhausted pollutants can be reduced. In the intake conduit a throttle for adjusting the flow rate of the flow to the internal combustion engine is present. By means of the throttle, a differential pressure is generated that is utilized for driving a turbo-engine. The turbo-engine is provided as a motor for a compressor that charges fresh air (secondary air) into the exhaust gas conduit.

Charging secondary air into the exhaust gas is important after starting the internal combustion engine in order not to surpass the legally prescribed exhaust gas values. After starting the internal combustion engine, several crankshaft revolutions are required until a satisfactory differential pressure is generated for driving the turbo-engine. The speed of the turbo-engine increases gradually until the maximum working engine speed is achieved. In this time period, not enough secondary air is charged into the exhaust gas so that the exhaust gas values do not fulfill the legal requirements.

Moreover, DE 100 64 481 discloses an internal combustion engine with secondary air charger and a method for controlling the secondary air charger. The secondary air charger conveys fresh air into the exhaust gas area. The fresh air that is compressed by the secondary air charger exhibits a temperature increase downstream of the compressor. On the other hand, a temperature drop occurs in the case of air expanded by the turbine. These temperature values are acquired and evaluated so that conclusions can be drawn in regard to the conveying performance. Accordingly, a control of the secondary air charger can be realized. After the internal combustion engine has been started, slowly a vacuum is created that leads to a gradual running up of the secondary air charger. Until the secondary air charger has reached its working range so as to develop its full output, a longer period of time elapses.

DE 102 35 341 discloses an internal combustion engine comprising a secondary air charger for charging secondary air into an exhaust gas pipe of the internal combustion engine. The function of the secondary air charger can be monitored by a testing procedure. For this purpose, a control valve is provided that is arranged in a bypass to a fresh air conduit; after its actuation, the turbine is loaded with fresh air. In this embodiment, the turbine also requires some time until it reaches its working range.

It is an object of the invention to provide an internal combustion engine with a system for secondary air charging with which charging of fresh air (secondary air) can be realized reliably and inexpensively, which can be mounted in tight spaces and reaches the working range quickly.

SUMMARY OF THE INVENTION

This object is solved in connection with the internal combustion engine in that in the discharge conduit a valve is arranged that can be actuated by a vacuum cell wherein an electro-pneumatic converter is arranged in operative connection to the vacuum cell and wherein the vacuum cell, when reaching a defined differential pressure, opens the valve suddenly and in this way a vacuum pulse is generated that acts on the turbo-engine. This object is solved in connection with the method in that when starting the internal combustion engine a vacuum is generated in the intake air conduit which vacuum is generated also in the discharge conduit when the throttle is closed wherein the vacuum causes a sudden opening of the valve and loads the turbo-engine with a pressure pulse, so that the compressor charges fresh air into the exhaust gas conduit.

ADVANTAGES OF THE INVENTION

The internal combustion engine according to the invention comprises a system for secondary air charging. The secondary air charging is realized in a cold start phase of the internal combustion engine when the exhaust gases contain too many pollutants such as hydrocarbons (HC) and carbon monoxide (CO). The supply of fresh air into the exhaust gas reduces the emission of pollutants by after-oxidation of the pollutants. The after-oxidation increases the exhaust gas temperature which leads to a faster heating of a catalytic converter arranged within the exhaust gas train. After the cold start phase of e.g. 60 sec. after having started the internal combustion engine the supply of fresh air into the exhaust gas is stopped.

The internal combustion engine comprises an intake air conduit in which preferably an air filter is arranged. The intake air conduit has an intake air conduit opening through which ambient air can pass into the intake air conduit. The air supplied to the internal combustion engine is filtered by the air filter. In the intake air conduit, a throttle is arranged which controls the flow rate of the flow passing through the intake air conduit in accordance with the operating states of the internal combustion engine. The throttle can be e.g. in the form of a flap wherein however other devices that serve for adjusting the flow rate can be used also. The intake air conduit connects a combustion unit with the ambient air so that a defined flow rate can be supplied to the combustion unit. The combustion unit according to this invention is a device that generates utilizable energy by combustion of fuel. In this connection, the combustion unit can be e.g. a reciprocating piston engine. The combusted air/fuel mixture is then discharged from the internal combustion engine by an exhaust gas conduit. The intake air conduit is connected by a supply conduit and a discharge conduit to a turbo-engine. Between the supply and discharge conduits the throttle is arranged in the intake air conduit. The supply conduit is connected to the intake air conduit in the area that is arranged between the throttle and the intake air conduit opening. The discharge conduit is connected between the throttle and the combustion unit in like fashion to the intake air conduit. A turbo-engine according to this invention is to be understood as a device that can be driven by a pressure differential. Advantageous embodiments in this connection are e.g. turbines in which the turbine impeller is driven by the pressure differential. The turbo-engine is correspondingly connected to a compressor wherein the compressor compresses a gas, in particular air to a pressure level that is higher than the pressure in the exhaust gas conduit. The compressor is connected correspondingly by a connecting conduit to the exhaust gas conduit so that the air compressed by the compressor can be introduced into the exhaust gas conduit. In the discharge conduit, a valve is arranged that can be actuated by a vacuum cell. The valve can close or open the discharge conduit in accordance with the operating states of the internal combustion engine. For this purpose, rotary flaps or pivot flaps or rotary slides can be used, for example. As soon as the switching pressure of the vacuum cell is reached, the vacuum cell switches and opens the valve suddenly. Upon reaching a defined pressure differential relative to the vacuum cell in the discharge conduit, the valve opens suddenly and generates thus a vacuum pulse that acts on the turbo-engine. As a result of the vacuum pulse, the turbo-engine is transferred into the operating state in a very short amount of time. The pressure differential for the closed valve in the discharge conduit corresponds to the pressure differential in the intake air conduit because the supply and discharge conduits of the turbo-engine corresponds without significant pressure losses with the intake air conduit before or after the throttle. Since the intake air conduit has a limited volume, directly after starting the combustion unit a vacuum is generated in the intake air conduit because the air present in the intake air conduit is sucked into the combustion unit. Accordingly, the required differential pressure, for example, for a reciprocating piston engine is generated already after half a rotation of the crankshaft. Opening of the valve in the discharge conduit is therefore realized at an extremely early point in time. In order to close off the discharge conduit again, an electro-pneumatic converter is provided that is arranged in operative connection with the vacuum cell. In accordance with its actuation, the converter can lock the vacuum cell so that the vacuum cell cannot switch or can release the vacuum cell so that vacuum cell can switch when an appropriate differential pressure is present. In order to close off the discharge conduit, the electric switching current is separated from the electro-pneumatic converter so that the converter is reset and then separates the vacuum cell from the differential pressure in the conduit. Accordingly, the vacuum cell switches again and actuates the valve so that the discharge conduit is closed off. The secondary air system comprises the following components: turbo-engine, compressor, valve, electro-pneumatic converter; vacuum cell, supply and discharge conduits. In known secondary air charging systems early switching can be achieved only by expensive electronic or large-volume components, for example, a vacuum storage device. The internal combustion engine according to the invention however comprises only small and inexpensive components in connection with secondary air charging.

According to one embodiment of the invention, the electro-pneumatic converter has a venting bore. By means of the venting bore, the converter is connected correspondingly to ambient pressure. Accordingly, the converter is reset and can actuate the vacuum cell again when the internal combustion engine is started again.

According to an advantageous embodiments of the invention, the electro-pneumatic converter, the vacuum cell and the valve are integrated in one component wherein this component comprises a housing that has the required connectors. By means of this design, only one component must be mounted in the intake system of the internal combustion engine so that assembly is simplified.

It is advantageous that the valve closes off the discharge conduit at defined operating states of the internal combustion engine so that the turbo-engine is switched off. The turbo-engine can operate only when a differential pressure is present in the intake conduit. In this case, the taken-in air passes through the turbo-engine so that the flow resistance is increased for the taken-in air. Because the secondary air charger is required only in the cold start phase, an unnecessary operation of the turbo-engine and thus energy loss are prevented.

According to a further embodiment of the invention, the valve has two positions wherein the first position is "OPEN" and the second position is "CLOSED". This valve can also be referred to as a digital valve because it can be only in two positions. Such valves are inexpensive.

The method according to the invention for operating an internal combustion engine with a system for secondary air charging generates a vacuum into the intake air conduit by the piston movement that is caused upon starting the internal combustion engine by rotation of the crankshaft. The vacuum is generated in that the air flows into the combustion unit and is combusted. The air removed from the intake air conduit must be replaced in the intake air conduit by ambient air flowing in through the intake air conduit opening. When the throttle is closed, vacuum is also generated in the discharge conduit that connects the turbo-engine with the intake air conduit. By sudden switching of the vacuum cell the valve is also suddenly opened and the turbo-engine is loaded with a pressure pulse. The pressure pulse has the effect that the turbo-engine is accelerated very quickly to the required working engine speed. The compressor connected to the turbo-engine can thus compress air at a very early point in time after starting the internal combustion engine and can charge this fresh air into the exhaust gas conduit. Accordingly, pollutants contained in the exhaust gas can be reduced at an early point in time; the after-oxidation of the pollutants causes an increase of the exhaust gas temperature and thus heats a catalytic converter contained in the exhaust gas train faster to operating temperature.

According to a further embodiment of the method according to the invention, the valve is closed again after a cold start phase. The cold start phase is the operating state of the internal combustion engine in which the components are not yet heated to the operating temperature. In particular, the first 60 seconds after starting the internal combustion engine are referred to as cold start phase. After the cold start phase charging secondary air into the exhaust gas is no longer required because the combustion unit can combust the fuel better so that it exhausts fewer pollutants. Moreover, the catalytic converter is heated to operating temperature and can thus reduce the residual exhausted pollutants.

This and other features of preferred embodiments of the invention result from the claims as well as the description and the drawing wherein the individual features taken alone or several of them in the form of subcombinations can be realized in the embodiment of the invention or in other fields and can represent advantageous and protectable embodiments in themselves for which protection is claimed herein.

BRIEF DESCRIPTION OF THE DRAWINGS

Further details of the invention are described in the drawing based on schematic embodiments. It is shown in.

DESCRIPTION OF THE EMBODIMENTS

Figure 1:
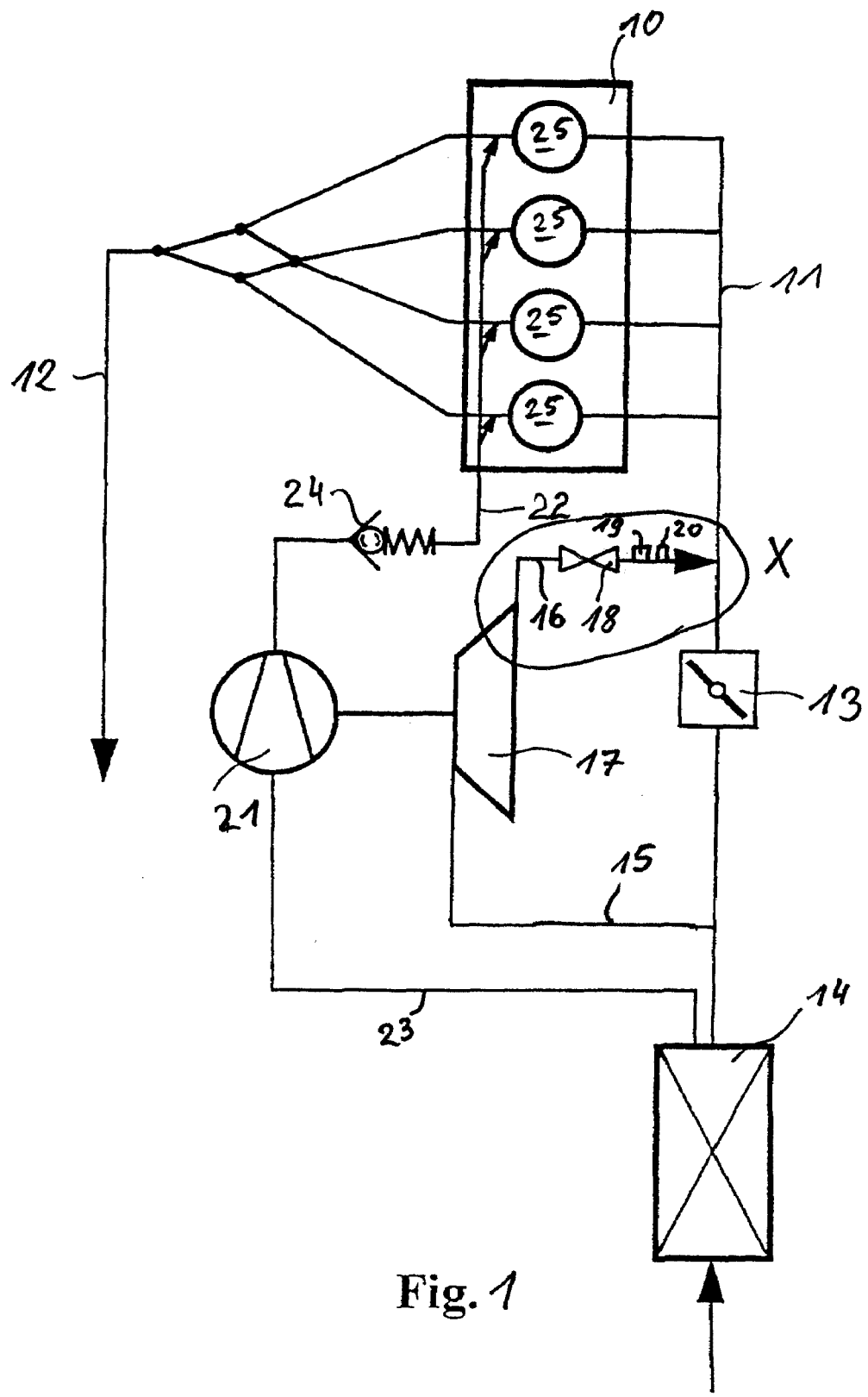
FIG. 1 a basic illustration of an internal combustion engine with a system for secondary air charging.

In FIG. 1, a basic illustration of an internal combustion engine with a system for secondary air charging is illustrated. The internal combustion engine has a combustion unit 10 that is designed as a reciprocating piston engine with cylinders arranged in-line. Of course, the cylinders can also be arranged in any other variant, for example, embodied as a radial engine, a V-engine, a boxer engine, a U-engine, or an opposed-piston engine. The combustion unit is connected to an intake air conduit 11 and an exhaust conduit 12. In the intake air conduit 11 a throttle 13 and an air filter 14 are arranged. The throttle 13 is designed as a throttle flap. A turbo-engine 17 is connected by a supply conduit 15 and a discharge conduit 16 to the intake air conduit 11. The turbo-engine 17 is preferably designed as a turbine. Examples of turbo-engines in particular, turbines, are well known in the prior art. The supply conduit 15 is connected between the air filter 14 and the throttle 13 to the intake air conduit 11. The discharge conduit 16 is connected between throttle 13 and combustion unit 10 to the intake air conduit 11. In the discharge conduit 16 a valve 18, a vacuum cell 19, and an electro-pneumatic converter 20 are arranged wherein the vacuum cell 19 and the valve 18 are arranged so as to be in operative connection with one another. The vacuum cell 19 is also connected in operative connection to the converter 20. By actuation of the converter 20, the vacuum cell 19 can switch when the switching pressure is present. When the converter 20 is no longer supplied with electric control current, it vents relative to the ambient and closes so that the vacuum cell 19 no longer receives a control pressure and also closes. The components 18, 19, 20 must not be arranged in series, as in the illustration. The appropriate operative connections are however required wherein the arrangement of the components can be selected as desired. The turbo-engine 17 is connected to a compressor 21 wherein the turbo-engine 17 represents the drive for the compressor 21. The compressor 21 is connected by a connecting line 22 to the exhaust gas line 12 and by means of air conduit 23 to the air filter 14. In the connecting line there is a check valve 24 that prevents exhaust gases from passing into the compressor.

When starting the combustion unit 10, the air is taken in from the intake air conduit 11 into the combustion chamber of the combustion unit 10. In this way, a vacuum is created in the area of the intake air conduit 11 up to the throttle 13. This vacuum continues within the discharge conduit 16. After a defined vacuum has been generated, the vacuum cell 19 switches the valve 18 so that a vacuum pulse acts on the turbo-engine 17. With the throttle 13 closed, air is sucked in from the filter 14 through the supply line 15 into the turbo-engine 17. The air flows then through the discharge conduit 16 into the intake line 11 downstream of the throttle 13 and to the combustion unit 10. By means of this air flow the turbo-engine 17 is operated. Because the turbo-engine 17 and the compressor 21 are connected, the compressor 21 is thus also operated. It sucks in air from the air filter 14 and compresses the air to a pressure level that is above that of the exhaust gas pressure. The compressed air is then forced through the connecting line 22 into the exhaust gas conduit 12 where the pollutants are after-oxidized. After a defined period of time, in particular 60 seconds after the start of the combustion unit, the valve 18 is closed again by means of electric actuation of the electro-pneumatic converter that is being vented so that the turbo-engine 17 no longer receives any energy and therefore can no longer operate the compressor 21. Charging secondary air into the exhaust gas is then terminated.

Figure 2:
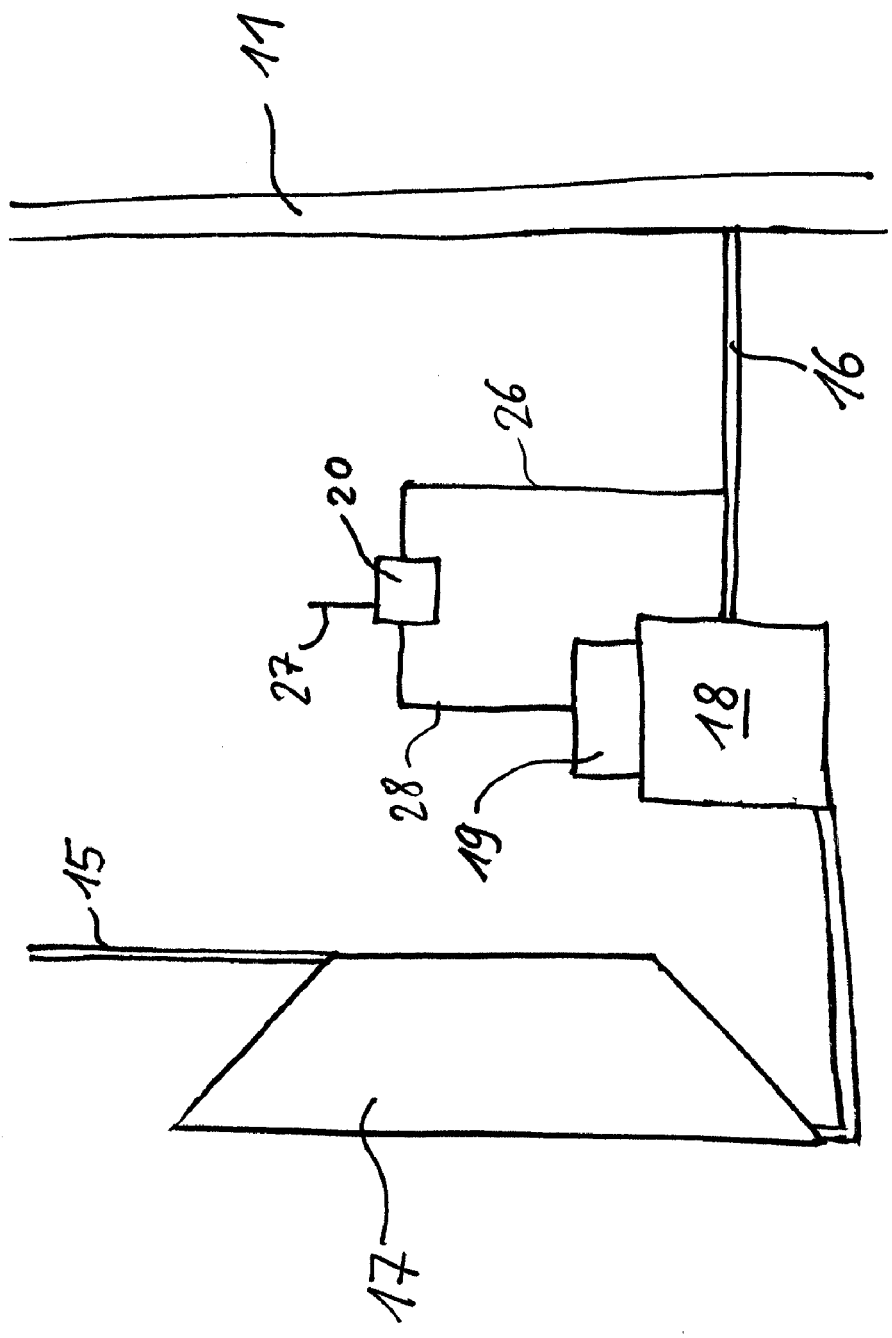
FIG. 2 a detail X according to FIG. 1.

In FIG. 2, a detail according to FIG. 1 is illustrated. Components corresponding to those of FIG. 1 are referenced with same reference numerals. The components are somewhat modified with regard to their arrangement wherein the action of individual components is unchanged. The electro-pneumatic converter 20 has a conduit 26 with which it is connected to the discharge conduit 16. Moreover, the converter 20 has a venting line 27 through which it communicates with ambient pressure. The vacuum cell 19 is connected by conduit 28 to the converter 20. In this embodiment, the vacuum cell 19 is connected directly to the valve 18 that releases or interrupts the air flow to the discharge conduit 16.

Figure 3:
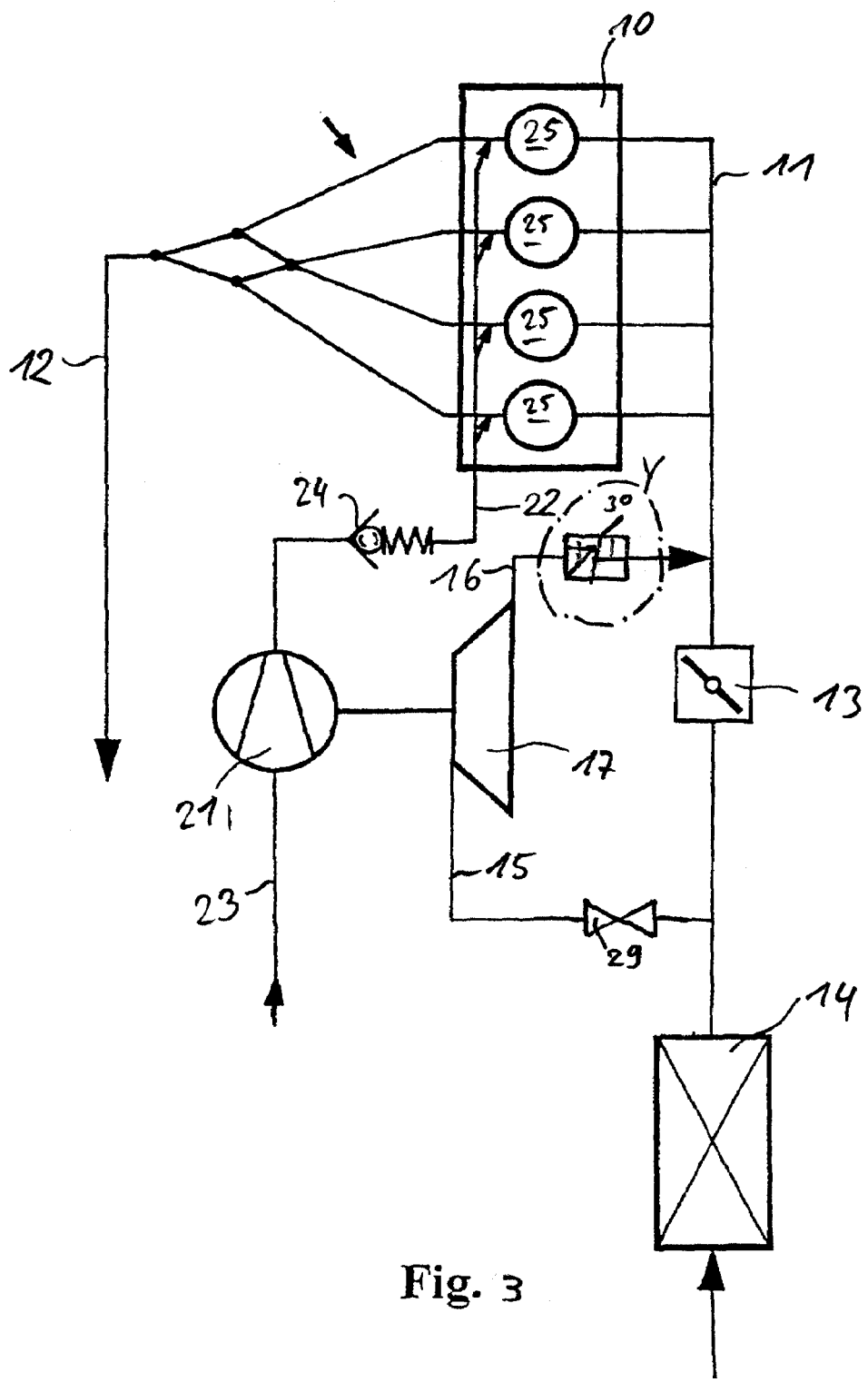
FIG. 3 a basic illustration of an internal combustion engine with a system for secondary air charging in an alternative embodiment, FIG. 4 a detail Y according to FIG. 3.

In FIG. 3 a basic illustration of an internal combustion engine with a system for secondary air charging is illustrated in one variant. Components corresponding to those of FIG. 1 are referenced with same reference numerals. In contrast to FIG. 1 the air conduit 23 is not directly connected to the air filter 14. The air for the compressor 21 is taken in at a different location; a separate filter (not illustrated) can be provided that filters the air supplied to the compressor 21. In the supply conduit 15 a valve unit 29 is arranged that can control the gas supply to the turbo-engine 17. In this way, a targeted adjustment of the speed of the turbo-engine is possible. In this way, the air flow can be unthrottled, throttled, or completely interrupted. A further difference relative to the internal combustion engine of FIG. 1 resides in that the valve 18, the vacuum cell 19, and the electro-pneumatic converter 20 are integrated into a modular component 30.

Figure 4:
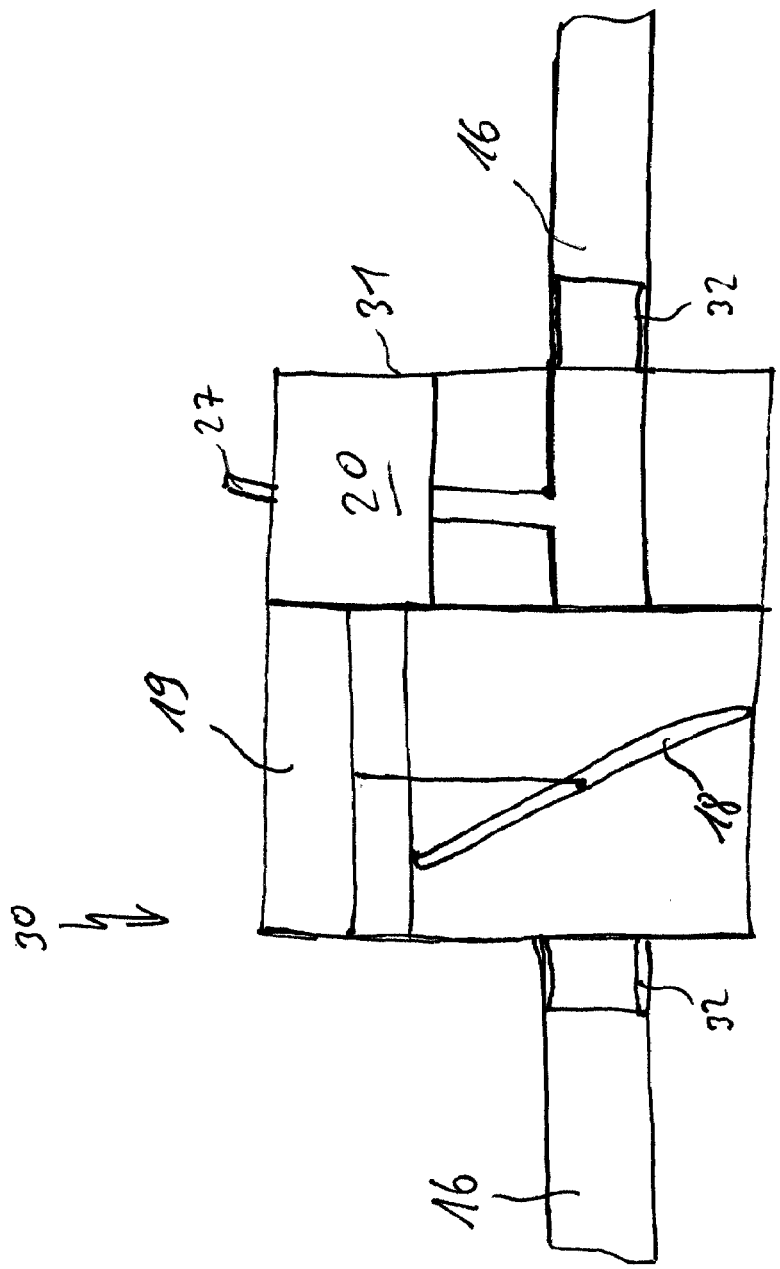

In FIG. 4, the modular component 30 according to FIG. 3 is illustrated. The component has a housing 31 that encloses the valve 18, the vacuum cell 19, and the electro-pneumatic converter 20. Moreover, the housing 31 has connectors 32 for the discharge conduit 16. The air flows from the discharge conduit 16 into the housing. Depending on the operating state, the valve 18 releases the flow cross-section or opens it. The venting bore 27 is connected to ambient air pressure wherein the sucked-in air of the discharge conduit 16 cannot escape through the venting bore 27 or no wrong air can be sucked in through the venting bore into the discharge conduit 16.

Figure 5:
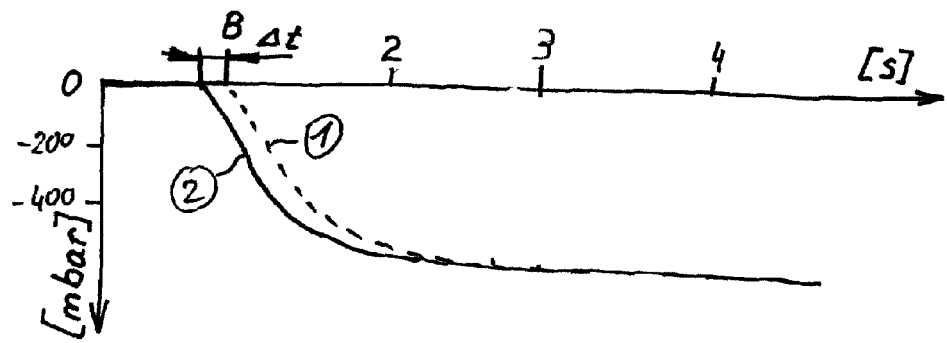
FIG. 5 a suction pressure diagram of the turbo-engine.

In FIG. 5, a vacuum pressure diagram is illustrated. On the abscissa (X axis) the time is shown in [sec.] and on the ordinate (Y axis) the vacuum pressure in [mbar] is plotted. In the diagram, the curve (1) in dashed lines shows the vacuum pressure behavior of a secondary air charger known in the art and the curve (2) in solid line shows the vacuum pressure behavior of the secondary air charger according to the invention. The dashed curve begins to build an underpressure at point "B". In the inventive system, the vacuum is built up already at point "A" after approximately 0.8 sec. Accordingly the system according to the invention is faster by Δt of approximately 0.2 sec.

Figure 6:
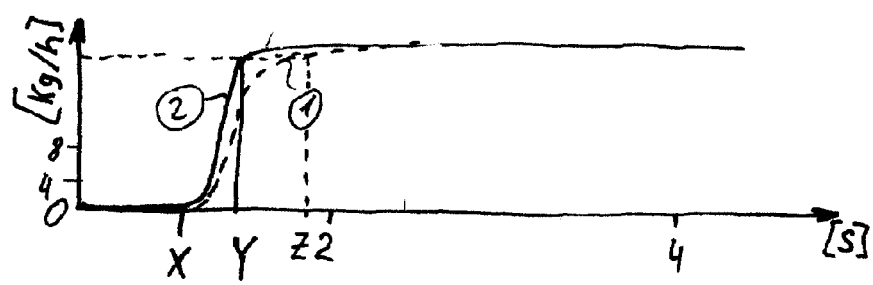
FIG. 6 a mass flow diagram of the turbo-engine.

FIG. 6 shows a mass flow diagram. On the abscissa (X axis) as in FIG. 5 the time in [sec.] and on the ordinate (Y axis) the mass flow of the turbo-engine (turbine) is plotted in [kg/h]. The dashed curve (1) illustrates as in FIG. 5 the system known in the art for secondary air charging. The solid curve (2) represents again the course of the system according to the invention. The mass flow of the device according to the invention reaches at point "Y" a value that is reached by the system according to the art at point "Z". As described in FIG. 5, the system according to the invention starts earlier at point "X" than the system known in the art. In regard to the final output of both systems no differences are present anymore.

Figure 7:
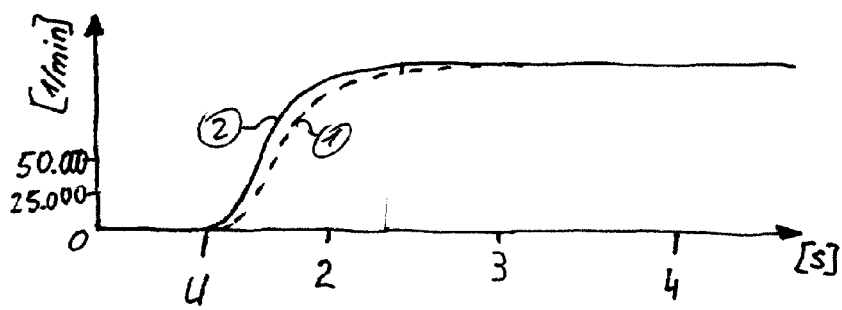
FIG. 7 a speed diagram of the turbo-engine.

In FIG. 7 a speed diagram is illustrated. On the abscissa (X axis) the time in [sec.] is shown as in FIGS. 5 and 6 and on the ordinate (Y axis) the speed in [1/min.] is illustrated. As discussed in connection with FIGS. 5 and 6, the dashed curve (1) illustrates the course of the system as known in the art and the solid curve (2) shows the course of the device according to the present invention. In this diaphragm it is also shown that the system according to the present invention at point "U" starts earlier than the system known in the art and moreover also reaches the maximum speed earlier. As a function of the speed of the turbo-engine (according to FIG. 1 or FIG. 3), the compressor (according to FIG. 1 or 3) can begin compression of air earlier and can supply air at an earlier point in time into the exhaust gas.

What is claimed is:

1. A method of operating an internal combustion engine having a combustion unit; an air filter; a throttle; an intake air conduit connected to the combustion unit, said intake air conduit having two separate conduit sections, a first section of the air intake conduit having a first end connected to an outlet of the air filter and a second end connected to an inlet of the throttle; and a second section of the air intake conduit connecting an outlet of the throttle to the combustion unit, wherein the throttle valve is arranged in the intake air conduit between the first and second sections; an exhaust gas conduit connected to the combustion unit; a turbo-engine connected to the intake air conduit by a supply conduit connected upstream of the throttle and by a discharge conduit connected downstream of the throttle; a compressor operatively driven by the turbo-engine and connected by a connecting line to the exhaust gas conduit; wherein said turbo-engine and said compressor are both arranged separated from said air filter, a valve arranged in the discharge conduit; a vacuum cell actuating the valve; an electro-pneumatic converter operatively connected to the vacuum cell; wherein the electro-pneumatic converter in a first state is operable to lock the vacuum cell preventing the vacuum cell from switching regardless of differential pressure, wherein the electro-pneumatic converter in a second state is operable to release the vacuum cell so the vacuum cell is able to switch at the predefined differential pressure, the method comprising the steps of:
    generating a vacuum pulse in the intake air conduit and also in the discharge conduit when starting the internal combustion engine with the throttle being closed;
    suddenly opening the valve by the vacuum pulse reaching a defined differential pressure in the discharge conduit;
    loading the turbo-engine with the defined differential pressure as the valve opens suddenly;
    charging secondary air into the exhaust gas conduit with the compressor driven by the turbo-engine.

2. The method according to claim 1, wherein the valve is closed again after a cold start phase of the internal combustion engine.

3. An internal combustion engine with a system for secondary air charging, the engine comprising:
    a combustion unit,
    an air filter;
    a throttle;
    an intake air conduit connected to the combustion unit, said intake air conduit having two separate conduit sections,
        a first section of the air intake conduit having a first end connected to an outlet of the air filter and a second end connected to an inlet of the throttle; and
        a second section of the air intake conduit connecting an outlet of the throttle to the combustion unit,
        wherein the throttle valve is arranged in the intake air conduit between the first and second sections;
    an exhaust gas conduit connected to the combustion unit;
    a turbo-engine
        connected to the first section of the intake air conduit by a supply conduit connected upstream of the throttle and
        connected by a discharge conduit into the second section of the intake air conduit at a position downstream of the throttle;
    a compressor,
    wherein the turbo-engine is connected operatively to drive the compressor and
    wherein the compressor is connected by a connecting line to the exhaust gas conduit;
    wherein said turbo-engine and said compressor are both arranged separated from said air filter,
    a valve arranged in the discharge conduit;
    a vacuum cell actuating the valve; and
    an electro-pneumatic converter operatively connected to deliver or vent a vacuum pulse to the vacuum cell;
    wherein the vacuum cell, when reaching a defined differential pressure, opens the valve suddenly so that a vacuum pulse is generated that acts on the turbo-engine,
    wherein the electro-pneumatic converter in a first state is operable top lock the vacuum cell preventing the vacuum cell from switching regardless of differential pressure,
    wherein the electro-pneumatic converter in a second state is operable to release the vacuum cell so the vacuum cell is able to switch at the predefined differential pressure.

4. The internal combustion engine according to claim 3, wherein
    the electro-pneumatic converter comprises a venting bore.

5. The internal combustion engine according to claim 4 wherein
    the electro-pneumatic converter, the vacuum cell, and the valve are integrated into a common housing as a modular component,
    wherein the valve closes off the discharge conduit at defined operating states of the internal combustion engine so that the turbo-engine is switched off, and
    the vacuum cell operates the discharge line valve in only two positions, a first one of the two positions is an "ON" and a second one of the two positions is an "OFF" position.

6. The internal combustion engine according to claim 3, wherein
    the electro-pneumatic converter, the vacuum cell, and the valve are integrated into a common housing as a modular component.

7. The internal combustion engine according to claim 3, wherein the valve closes off the discharge conduit at defined operating states of the internal combustion engine so that the turbo-engine is switched off.

8. The internal combustion engine according to claim 3, wherein
    the valve has only two positions,
    wherein a first one of the two positions is an "ON" and a second one of the two positions is an "OFF" position.

* * * * *